(12) United States Patent
Branson

(10) Patent No.: US 6,819,304 B2
(45) Date of Patent: Nov. 16, 2004

(54) ADJUSTABLE DISPLAY DEVICE WITH DISPLAY ADJUSTMENT FUNCTION AND METHOD THEREFOR

(75) Inventor: Michael John Branson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 09/976,661

(22) Filed: Oct. 11, 2001

(65) Prior Publication Data

US 2003/0071832 A1 Apr. 17, 2003

(51) Int. Cl.$^7$ .............................................. G09G 5/00
(52) U.S. Cl. .................................... 345/1.3; 345/698
(58) Field of Search ...................... 345/1.1, 1.3, 108, 345/901, 903, 660, 698, 699, 668; 361/681

(56) References Cited

U.S. PATENT DOCUMENTS

| | | | | |
|---|---|---|---|---|
| 5,459,825 A | * | 10/1995 | Anderson et al. | 345/815 |
| 5,467,102 A | * | 11/1995 | Kuno et al. | 345/1.3 |
| 5,790,371 A | * | 8/1998 | Latocha et al. | 361/683 |
| 6,320,591 B1 | * | 11/2001 | Griencewic | 345/582 |
| 6,327,482 B1 | * | 12/2001 | Miyashita | 455/566 |
| 6,335,678 B1 | * | 1/2002 | Heutschi | 340/286.02 |
| 2002/0005818 A1 | * | 1/2002 | Bruzzone | 345/6 |

FOREIGN PATENT DOCUMENTS

| | | | | |
|---|---|---|---|---|
| EP | 1 168 143 A1 | * | 1/2002 | G06F/1/16 |
| JP | 2002/91348 | * | 3/2002 | G09F/9/40 |

OTHER PUBLICATIONS

Eggebrecht, "Interfacing to the IBM Personal Computer", Second Edition, Howard W. Sams and Company, 1990, pp. 211–212.*
EDRC Foldable Display, www.ices.cmu.edu/design/foldabledisplay.html (accessed Oct. 1, 2001).
Notebooks to Get Foldable Displays, PCWorld.com, IDG News Service (Sep. 6, 2000).

* cited by examiner

Primary Examiner—Alexander Eisen
(74) Attorney, Agent, or Firm—Dugan & Dugan

(57) ABSTRACT

In a first aspect, an adjustable display device is provided which includes a plurality of display segments defining an adjustable size of a display device for displaying data, and a detection mechanism operatively coupled to the plurality of display segments. The detection mechanism is configured to detect a change in size of the display device by displacement of at least one of the plurality of display segments and to generate a corresponding detection signal. The adjustable display device further includes a controller operatively coupled to the detection mechanism and configured to (1) receive the detection signal; (2) adjust displayed data of the display device in response to the detection signal; and (3) display the adjusted displayed data on one or more of the display segments. Numerous other aspects are provided.

36 Claims, 7 Drawing Sheets

ADJUSTABLE DISPLAY DEVICE WITH DISPLAY ADJUSTMENT FUNCTION AND METHOD THEREFOR

FIELD OF THE INVENTION

The present invention relates to display devices. In particular, the present invention relates to a method and apparatus for modifying the size and/or resolution of displayed information corresponding to changes in the size of a display area of the display device.

BACKGROUND OF THE INVENTION

One major criterion for functionality of portable devices such as personal digital assistants (PDAs) is size. Designers constantly battle with the trade off between compactness of the device, thus enhancing portability, and optimum size of the device's user interface such as the display screen. Indeed, the more compact the portable device, the smaller the display screen size for users. While most consumers desire multi-functional portable devices that are compact and lightweight, they also tend to prefer as large a display screen size as possible for these portable devices. However, the display screen size is limited by the physical dimensions of the portable devices.

Through recent advances in display technology, displays which are flexible in nature and thus able to be folded have been developed. For example, Philips Electronics, NV of the Netherlands has introduced display technology using plastic polymer semiconductors rather than silicon, potentially paving the way for foldable, flexible display devices. In such devices, the display may comprise an active-matrix of a predetermined pixel count (such as 4,096 pixels which translate to 64 pixels square), where each pixel is controlled by a thin-film transistor (TFT) based on a polymer semiconductor.

A foldable display device is configured to fold in a similar manner as a wallet. In this manner, when the device is being carried around by a user, it may easily fit into the user's shirt or jacket pocket. When in use, the user may unfold the display device such that the display screen size of the device is many times larger than the folded size. For example, a tri-fold might provide a viewable screen size approximately three times the width of the screen in the folded state, thus, providing the largest display screen size when the device is in a completely unfolded state. Using a single screen with flexible circuitry, display devices may be folded a number of times for portability (though increasing the thickness of the device), and unfolded partially or completely by the user when in use.

The Institute for Complex Engineered Systems (ICES) at Carnegie Mellon University has introduced the concept of foldable displays to meet the needs of, for example, professionals and consumers who are more likely to operate the portable device in a setting outside the confines of an office or a home. The foldable display device from ICES is configured such that the displayed content changes depending on the number of times the display is folded. When the display screen size of the display device is relatively small (i.e., in a folded state), only applications which do not require large display area may be operated. When the display screen size of the foldable display device is increased (i.e., in an unfolded state), then corresponding applications which are preferably viewed on a larger screen (for example, web browsing using a browser application such as Microsoft Internet Explorer or Netscape Communicator) are operated. Additional information on this technology may be found at the following URL: http://www.ices.cmu.edu/design/foldabledisplay.html (last accessed Oct. 1, 2001).

Conventional foldable display devices have several disadvantages. Some foldable display devices are not operational in the folded state. When these display devices are folded, the entire screen is enclosed within the folded display device. For such devices, the ability to fold the display device is merely for convenience to allow the user to more easily transport the display device. Other foldable display devices significantly cut off the display content when in the folded state. Still other foldable display devices may show an undesirable line which extends across the seam of the fold.

In view of the foregoing, it would be desirable to have a foldable display device which is capable of dynamically adjusting the size and/or resolution of the displayed information in response to modifications to the display area resulting from folding and/or unfolding operations.

SUMMARY OF THE INVENTION

The present invention provides an adjustable display device which includes a plurality of display segments defining an adjustable size of a display device for displaying data, and a detection mechanism (e.g., a switch array) operatively coupled to the plurality of display segments. The detection mechanism is configured to detect a change in size of the display device by displacement of at least one of the plurality of display segments and to generate a corresponding detection signal. The adjustable display device further includes a controller operatively coupled to the detection mechanism and configured to (1) receive the detection signal; (2) adjust displayed data of the display device in response to the detection signal; and (3) display the adjusted displayed data on one or more of the display segments.

In one aspect, the displacement of the display segments may include unfolding or folding the display device such that the size of the display device is changed by at least one display segment. Alternatively, display segment displacement may include detaching or attaching at least one display segment of the display device. Furthermore, the detection mechanism may include a plurality of sensors, each sensor operatively coupled to a respective one of the plurality of display segments and configured to generate a detection signal when the corresponding display segment is displaced.

In at least one embodiment, displayed data may be changed in size by an amount that is substantially proportional to the change in the size of the display device, and/or a resolution of displayed data may be adjusted corresponding to the change in the size of the display device. Numerous other aspects are provided, as are methods and computer program products. Each inventive computer program product may be carried by a medium readable by a computer (e.g., a carrier wave signal, a floppy disk, a hard drive, a random access memory, etc.).

Other objects, features and advantages of the present invention will become more fully apparent from the following detailed description, the appended claims and the accompanying drawings.

DETAILED DESCRIPTION

Figure 1:
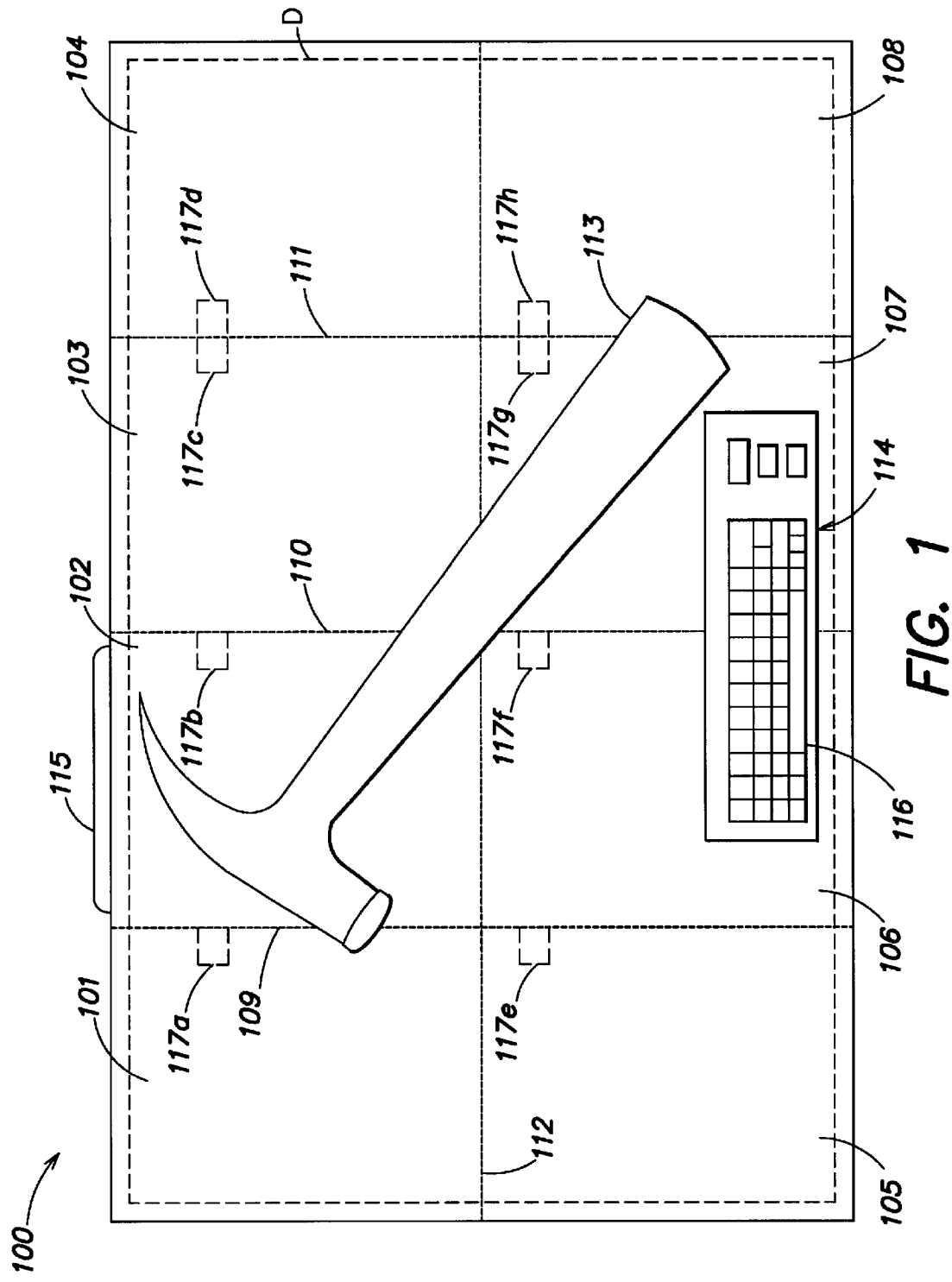
FIG. 1 is a front plan view of an adjustable display device.

FIG. 1 is a front plan view of an adjustable display device 100 configured in accordance with one embodiment of the present invention. As shown in FIG. 1, the adjustable display device 100 includes a plurality of display segments 101–108 together comprising the full display area of the adjustable display device 100. Although eight display segments 101–108 are illustrated, it will be appreciated that the adjustable display device 100 may include more or fewer display segments. While each of the display segments 101–108 is shown as having substantially the same display area size, within the scope of the present invention, the adjustable display device 100 may include display segments that are different in size. For example, the display segments 101, 104, 105 and 108 positioned at the corners of the adjustable display device 100 may be provided with shorter widths than display segments 102, 103, 106, and 107 positioned in the middle of the display area. Any other size variations also may be employed. In at least one embodiment of the present invention, the display area is integrated with the hardware components (FIG. 6) of the adjustable display device 100 such that the size of the display area is substantially the same as the size of the display device. However, in an alternate embodiment, the display area may be separate from the hardware components of the adjustable display device and/or may be a different size than the portion of the adjustable display device containing the hardware components.

The adjustable display device 100 further includes a plurality of vertical portions 109, 110, and 111, and a horizontal portion 112 that allow the display segments 101–108 of the adjustable display device 100 to be folded and unfolded and/or attached and reattached as described below. The "active" display area of the adjustable display device 100 (display area "D" in FIGS. 1–5D) is the overall display area of the adjustable display device 100 defined by active (e.g., unfolded or attached) display segments. A displayed image 113, for example, a graphical image of a hammer, is shown within the display area D of the adjustable display device 100 of FIG. 1. It will be understood that the display area D may display any suitable data (e.g., text, image, video, any combination thereof, etc.).

The adjustable display device 100 has various options for character input and/or focus control. For example, in any size configuration of the adjustable display device 100, a portion of the display area D may be used as a touch screen to facilitate character input. In the exemplary embodiment illustrated in FIG. 1, the adjustable display device 100 includes a touch sensitive input panel portion 114 for such purposes. Although the touch sensitive input panel portion 114 is shown at the bottom center of the display area D in FIG. 1, it will be appreciated that the touch sensitive input panel portion 114 may be located anywhere on the display area D, such as along the entire bottom of the display area D, or in a bottom corner of the display area D if the entire width of the display area D is not required to accommodate the touch input panel portion 114 (e.g., such as when a stylus or other similar input device is employed).

When the adjustable display device 100 is full size, the touch sensitive input panel portion 114 may comprise a touch screen keyboard that a user's fingers may operate. Likewise, when the adjustable display device 100 is a smaller size or is full size, a user may perform input operations of the adjustable display device 100 by using an input device 115, such as a stylus (e.g., shown along the top surface of the adjustable display device 100 in FIG. 1). The input device 115 can be used to depress or "tap" the appropriate location on the touch sensitive input panel portion 114. For example, the adjustable display device 100 may be configured to display a miniaturized keyboard 116 within the touch sensitive input panel portion 114 when the adjustable display device 100 detects that the input device 115 has been removed from its storage location (e.g., along the top surface of the adjustable display device 100). Thereafter, the user may perform input operations by selecting the appropriate key display of the displayed miniaturized keyboard 116 to perform the desired operations. The touch sensitive input panel portion 114 may be configured to display icons or data links which, upon selection by the user with the input device 115, may be configured to run a predetermined application installed in the adjustable display device 100. For example, the touch sensitive input panel portion 114 may be configured to display one or more graphical icons each respectively representing an application installed in the adjustable display device 100. When a displayed icon is selected, a corresponding application is initiated and thereafter displayed within the display area D of the adjustable display device 100.

Moreover, an external input device such as an external keyboard or a computer mouse (not shown) may be connected to the adjustable display device 100, rendering it unnecessary to provide the touch sensitive input panel portion 114 within the display area D for character input. Thus, the display area D (whether folded or not) may be maximized for displaying application content.

The adjustable display device 100 may be configured to run applications installed therein such as a word processing application, a calendaring application, a date book application, an order entry application, an e-mail application or a computer aided design (CAD) application. Any number of desired applications may be operated using the adjustable display device 100 depending upon the storage capacity of the adjustable display device 100 as well as the installed operating system software. The displayed image 113 may include any suitable user interface and may include an internet browser capable of displaying information retrieved from the internet. Such internet browsing capability may require that the adjustable display device 100 establish a connection to a data network, which may include data protocols such as TCP/IP or any other suitable protocol.

In one embodiment, a user may fold the adjustable display device 100 along any of the vertical portions 109, 110, and 111, or along the horizontal portion 112 (e.g., the adjustable display device 100 may be manufactured with flexible liquid crystal display (LCD) panels and include flexible printed circuits which allow the adjustable display device 100 to be folded along portions 109–112). However, unlike conventional foldable display devices, when the adjustable display device 100 is folded along portions 109–112 the display area D (the viewable portion of the display device 100) remains viewable (e.g., remains on the outside of the adjustable display device 100). Such folding modifies the display area D of the adjustable display device 100. In accordance with the modification of the display area D, the displayed image 113 is modified (e.g., to fit in the modified display area, so that only a portion of the displayed image 113 is displayed, etc., as described further below). In at least one embodiment, the displayed image 113 is modified such that the ratio of the size of the displayed image 113 to the size of the display area D is maintained, i.e., the change in size of the displayed image 113 is proportional to the change in size of the display area D.

The adjustable display device 100 can be folded into various sizes, all of which result in the display area D facing the user. Thus, a user can use the adjustable display device 100 in a size that is convenient for the user at a particular point in time. For example, it may be convenient for the user to have a small size display device such as for business meeting purposes. To decrease the size of the display area of the adjustable display device 100, undesired display segments, such as display segments 101 and 105, may be folded back behind desired display segments, such as display segments 102–104 and 106–108. In such an example, the folding takes place along portion 109. Later, the user may prefer the full size of the adjustable display device 100. To increase the size of the display area D, display segments 101 and 102 may be unfolded.

In an alternate embodiment, the adjustable display device 100 may be configured such that the display segments 101–108 are detachable and re-attachable along the vertical and horizontal portions 109–112. In such an embodiment, the vertical and horizontal portions 109–112 may include a latching mechanism (not shown), such as a tongue and groove mechanism, which permits display segments 101–108 to be easily detached and re-attached. In this manner, some of the display segments 101–108 may be removed to reduce the size of the display area D of the adjustable display device 100 (e.g., to improve portability). Removing some of the display segments 101–108 rather than folding them may improve portability of the display device 100 by decreasing its overall thickness and weight. The displayed image 113 may be modified to fit the adjusted display area as in the embodiment where the adjustable display device 100 is folded.

The vertical and horizontal portions 109–112 of the adjustable display device 100 may include a detecting mechanism, such as a sensing circuit (described with reference to FIG. 6), which generates one or more signals when one or more of the vertical and horizontal portions 109–112 is folded or detached. In this manner, the adjustable display device 100 may be configured to automatically detect a modification of the display area D based on a folding or detachment operation, and to transmit signals to applications running on the adjustable display device 100 (e.g., so that one or more of the resolution, amount, and size of the displayed image 113 may be adjusted as described below). By adjusting for different sizes of the display area, the adjustable display device 100 is capable of performing the same applications in each of its adjusted size states. In at least one embodiment, an array of switches 117*a–h* is coupled to display segments 101–108 as shown and detects folding/detachment and unfolding/reattachment thereof.

Figure 2:
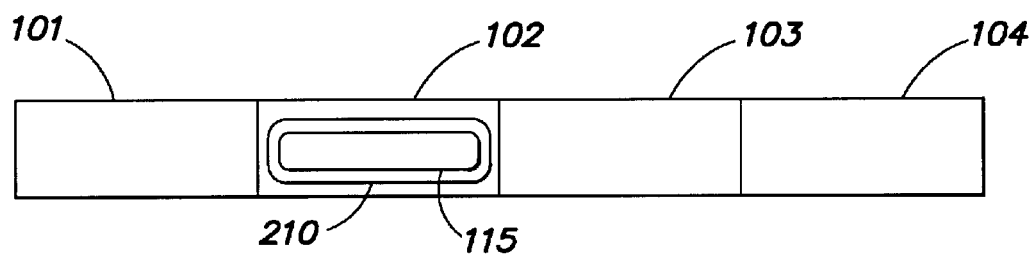
FIG. 2 is a top plan view of the adjustable display device of FIG. 1.
Figure 3:
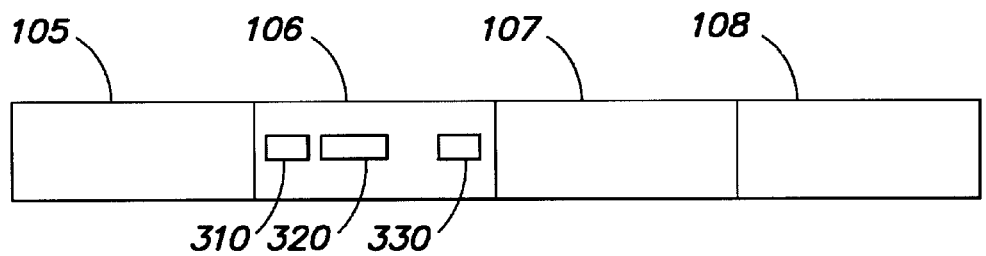
FIG. 3 is a bottom plan view of the adjustable display device of FIG. 1.

FIGS. 2 and 3 are a top plan view and a bottom plan view, respectively, of the adjustable display device 100 of FIG. 1 in an unfolded state. Referring to FIG. 2, a groove portion 210 is provided along the top surface of the adjustable display device 100, and in this exemplary embodiment, within the boundaries of the display segment 102. The groove portion 210 secures the input device 115 when it is the not in use, such as when the adjustable display device 100 is turned off or when the user does not anticipate performing any input operations.

The groove portion 210 may be configured to detect when the input device 115 is displaced from a locked position within the groove portion 210 (e.g., via a switch or some other conventional detection device (not shown)), and in response thereto, to display the touch sensitive input panel portion 114 in the display area D of the adjustable display device 100. Moreover, the groove portion 210 may be configured to detect when the input device 115 is placed in the locked position within the groove portion 210 (e.g., via the switch or other conventional detection device (not shown)), and in response thereto, to remove the display of the touch sensitive input panel portion 114 from the display area D of the adjustable display device 100 such that the display area may be maximized for displaying desired data.

While a stylus is illustrated as the input device 115 in FIGS. 1 and 2, within the scope of the present invention, other input devices, such as spring loaded input buttons and touch pads, may be provided for the adjustable display device 100. Additionally, while the groove portion 210 and the input device 115 shown in FIGS. 1 and 2 are provided on the top section of the display segment 102 of the adjustable display device 100, in alternate embodiments, the groove portion 210 and the input device 115 may be provided on other surfaces or portions of the adjustable display device 100 such that the user may have easy access to the input device 115 in each of the various adjusted states of the adjustable display device 100.

Referring now to FIG. 3, the bottom plan view of the adjustable display device 100 illustrates a plurality of communication terminals such as an infrared communication port 310, a USB port 320 and a Bluetooth port 330, provided on the bottom side of the display segment 106 of the adjustable display device 100. Other, fewer or more communication terminals may be provided. In this manner, the adjustable display device 100 may connect to one or more external devices. For example, a computer mouse device (not shown) or a standard computer keyboard (not shown) may be connected to the USB port 320 to enable a user to perform input operations. If the mouse device is capable of wireless data communication, the infrared communication port 310 or the Bluetooth communication port 330 may be used to connect the mouse device to the adjustable display device 100. Moreover, other external devices such as backup storage devices (e.g., Zip, SuperDisk, and CD-RW drives), server terminals, and communication devices (e.g., mobile telephones and personal digital assistants), having a complementary communication port and a compatible data communication protocol, may communicate with the adjustable display device 100.

The size of the communication ports 310, 320, 330 generally conforms to established industry standards, which may be a significant factor in determining the thickness of the adjustable display device 100. Indeed, as the portability and thus the desirability of the adjustable display device 100 tends to decrease with an increase in size and weight of the device, it may be desirable to integrate only those communication ports 310, 320, 330 that do not substantially increase the thickness and weight of the adjustable display device 100. For example, the use of parallel ports may not be desirable due to their large size. In contrast, infrared communication ports may be integrated into portable electronic devices without substantially adding to the size and weight of the device.

It will be appreciated that communication ports 310, 320, 330 shown in FIG. 3 may be provided at any location in the adjustable display device 100 so long as they are easily accessible at each adjusted state of the adjustable display device 100.

Figure 4C:
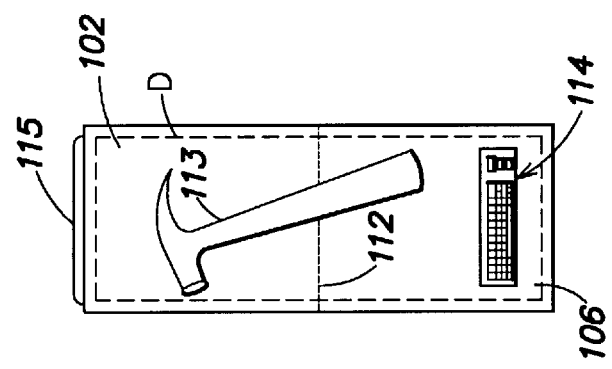
FIGS. 4A–4C are front plan views of the adjustable display device of FIG. 1 in three vertically collapsed states.
Figure 4B:
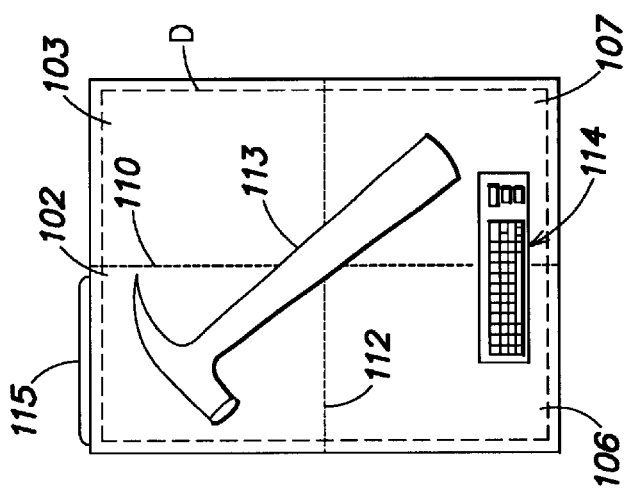
Figure 4A:
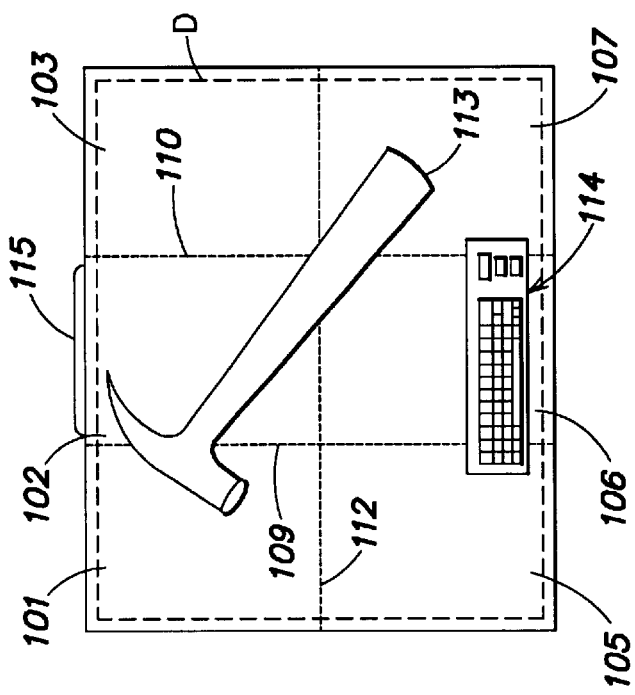

FIGS. 4A–4C are front plan views of the adjustable display device 100 of FIG. 1 in three vertically folded states. More specifically, FIG. 4A illustrates the adjustable display device 100 with display segments 104, 108 removed or folded back along vertical portion 111. In this state, the display area D of the adjustable display device 100 includes display segments 101, 102, 103, 105, 106, and 107. As also seen in FIG. 4A, a displayed image 113, which may be graphical or text data and which in the exemplary embodiment is a hammer, is repositioned so to be centered within the modified display area D of the adjustable display device 100 and is resized to fit entirely within the modified display area. Moreover, the touch sensitive input panel portion 114 is likewise repositioned and resized in accordance with the modified display area D. Thus, when the adjustable display device 100 is folded, the displayed image 113 is adjusted so that its size and position relative to the size of the display area D is maintained (whether the adjusted display device 100 is in an unfolded or folded state). The same may hold true when display segments of the adjustable display device 100 are attached/detached.

In at least one embodiment, the resolution of the displayed image 113 is also adjusted so that the quality and clarity of the displayed image 113 is maintained when the adjustable display device 100 is folded or when one or more of the display segments 101–108 are detached. For example, a fifty percent reduction in the size of the display area of the adjustable display device 100 need not equate to a fifty percent reduction in the size of the displayed image 113.

The maximum physical resolution of the adjustable display device 100 is defined by its hardware capacity. For example, a particular adjustable display device may be able to support 1600 by 1200 pixels of resolution, but no higher resolution due to hardware constraints. However, for various reasons, a user may prefer to reduce the resolution. For example, the user may reduce the resolution of the particular display to 1024 by 786 pixels. Thus, the actual resolution of the adjustable display device 100 may be set by the user. In this example, assuming an application is running on the adjustable display device 100 when the adjustable display device 100 is at full size, the user sees the 1024 by 786 pixels of resolution. If the adjustable display device 100 is folded in half and then into quarters, a straight reduction of the resolution would reduce the resolution of the display area D of the adjustable display device 100 to an actual resolution of 256 by 192 pixels. However, the adjustable display device 100 folded to this size may be capable of 400 by 300 pixels of resolution. Thus, applications and/or an operating system running on the adjustable display device 100 may determine that instead of reducing display resolution to 256 by 192 pixels, the display resolution should be adjusted to a higher resolution, such as the maximum resolution of 400 by 300 pixels.

Referring now to FIG. 4B, it can be seen that the display segments 101 and 105 of the adjustable display device 100 are removed or folded back along the vertical portion 109 as compared to the state shown in FIG. 4A. In this state, the display area D of the adjustable display device 100 includes only display segments 102, 103, 106, and 107. Again, with the modification of the display area D of the adjustable display device 100, the displayed image 113 is repositioned and resized so as to display the entire image in the modified display area. Additionally, the touch sensitive input panel portion 114 is similarly repositioned and resized, such that its size relative to the modified display area is reconfigured, preferably to maximize the size of the modified display area (while maintaining user accessibility).

Referring now to FIG. 4C, a further folding operation of the adjustable display device 100 along the vertical portion 110 is illustrated. In this state, the modified display area D of the adjustable display device 100 includes only display segments 102 and 106. The displayed image 113 and likewise the touch sensitive input panel portion 114 are repositioned and resized in the modified display area D of the adjustable display device 100.

In this manner, with each modification to the size of the display area D of the adjustable display device 100 (e.g., by folding or detaching along the vertical and/or horizontal portions 109–112), the adjustable display device 100 may dynamically, and in at least one embodiment automatically, reposition and resize the displayed image 113 such that the displayed image 113 can be seen in the newly sized display area. It will be understood that in some embodiments it may be desirable not to reposition and/or resize the displayed image 113 such that the displayed image 113 can be seen (in its entirety) in the newly sized display area of the adjustable display device 100. In yet a further embodiment, with each modification to the size of the display area D of the adjustable display device 100, the adjustable display device 100 may dynamically, and in at least one embodiment automatically, adjust the resolution of the displayed image 113.

Figure 5A:
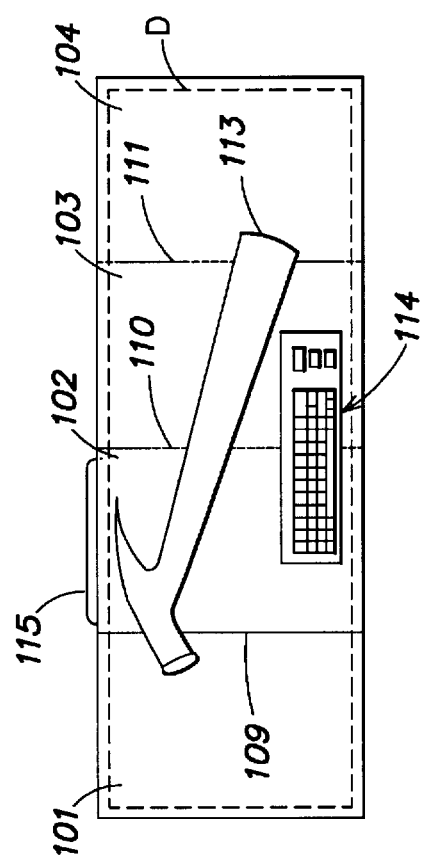
FIGS. 5A–5D are front plan views of the adjustable display device of FIG. 1 in combined vertically and horizontally collapsed states.

FIGS. 5A–5D are front plan views of the adjustable display device 100 of FIG. 1 in combined vertically and horizontally folded states. Referring to FIG. 5A, the adjustable display device 100 is shown folded along horizontal portion 112 or has had display segments 105–108 removed, such that the display area D includes display segments 101, 102, 103, and 104. In this state, the displayed image 113 and the touch sensitive input panel portion 114 have been repositioned and resized relative to the modified display area D.

Figure 5C:
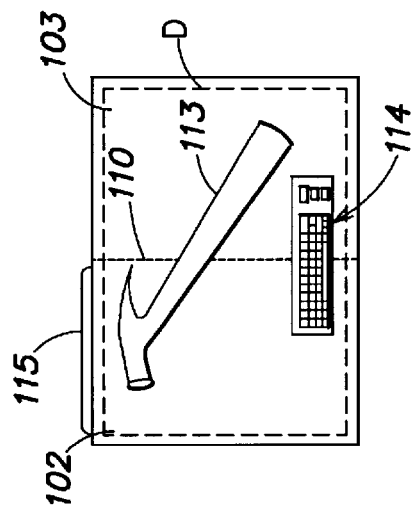
Figure 5B:
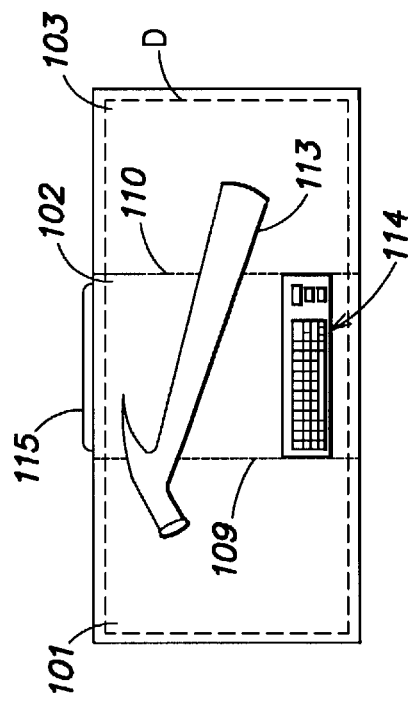
Figure 5D:
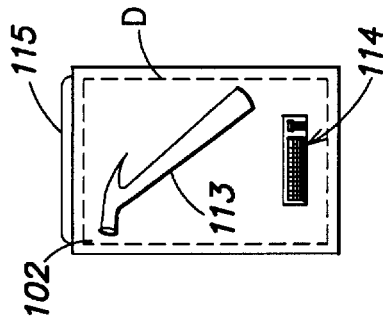

Referring now to FIGS. 5B–5D, it can be seen that these figures illustrate folding operations of the adjustable display device 100 successive to that illustrated in FIG. 5A. In particular, FIG. 5B illustrates a folding operation along the vertical portion 111 (or that display segment 104 has been removed), FIG. 5C illustrates a folding operation along the vertical portion 109 (or that display segment 101 has been removed), and FIG. 5D illustrates a folding operation along the vertical portion 110 (or that display segment 103 has been removed). These figures illustrate that the corresponding displayed images 113, as well as the respective touch sensitive input panel portions 114, are repositioned and resized relative to the respective modified display areas D. It will also be appreciated that with each detection of a folding (or detaching) operation, the adjustable display device 100 may adjust the resolution of the displayed image in a manner similar to that set forth above in accordance with the present invention.

In addition to adjusting size and/or resolution of displayed data (e.g., displayed image 113 and/or some other data) in response to a change is size of the display area D of the adjustable display device 100, other characteristics displayed data may be adjusted. For example, it may be desirable to change the amount of data displayed in the display area D of the display device 100 when the size of the display area D changed. With reference to FIGS. 4A and 4B, rather than reducing the size of the displayed image 113 (e.g., a hammer) when the segments 101, 105 are removed as shown in FIG. 4B, the display device 100 simply may not display the entire image 113 (e.g., the portion of the head of the hammer located in segment 101 in FIG. 4A need not be displayed in the display area D of FIG. 4B).

As another example, assume that the display area D of the display device 100 is full size (FIG. 1), and displays a table having five columns (TABLE 1 below). If display segments 104, 108 are folded/detached (FIG. 4A), only a portion (e.g., three columns) of the table need be displayed (TABLE 2 below). That is, the amount of data displayed in the display area D is reduced. A scroll bar or other positioning tool (not shown) may be employed to allow a user to "pan" to view any non-displayed data. Similarly, unfolding/attaching display segments may cause additional data (e.g., columns of a table, text, images, etc.) to be displayed. The format of displayed data (e.g., the number of characters in a line of text) similarly may be altered based the size of the display area D.

TABLE 1

| A | B | C | D | E |
|---|---|---|---|---|
| 1 | 2 | 3 | 4 | 5 |
| 1 | 2 | 3 | 4 | 5 |
| 1 | 2 | 3 | 4 | 5 |
| 1 | 2 | 3 | 4 | 5 |

TABLE 2

| A | B | C |
|---|---|---|
| 1 | 2 | 3 |
| 1 | 2 | 3 |
| 1 | 2 | 3 |
| 1 | 2 | 3 |

Figure 6:
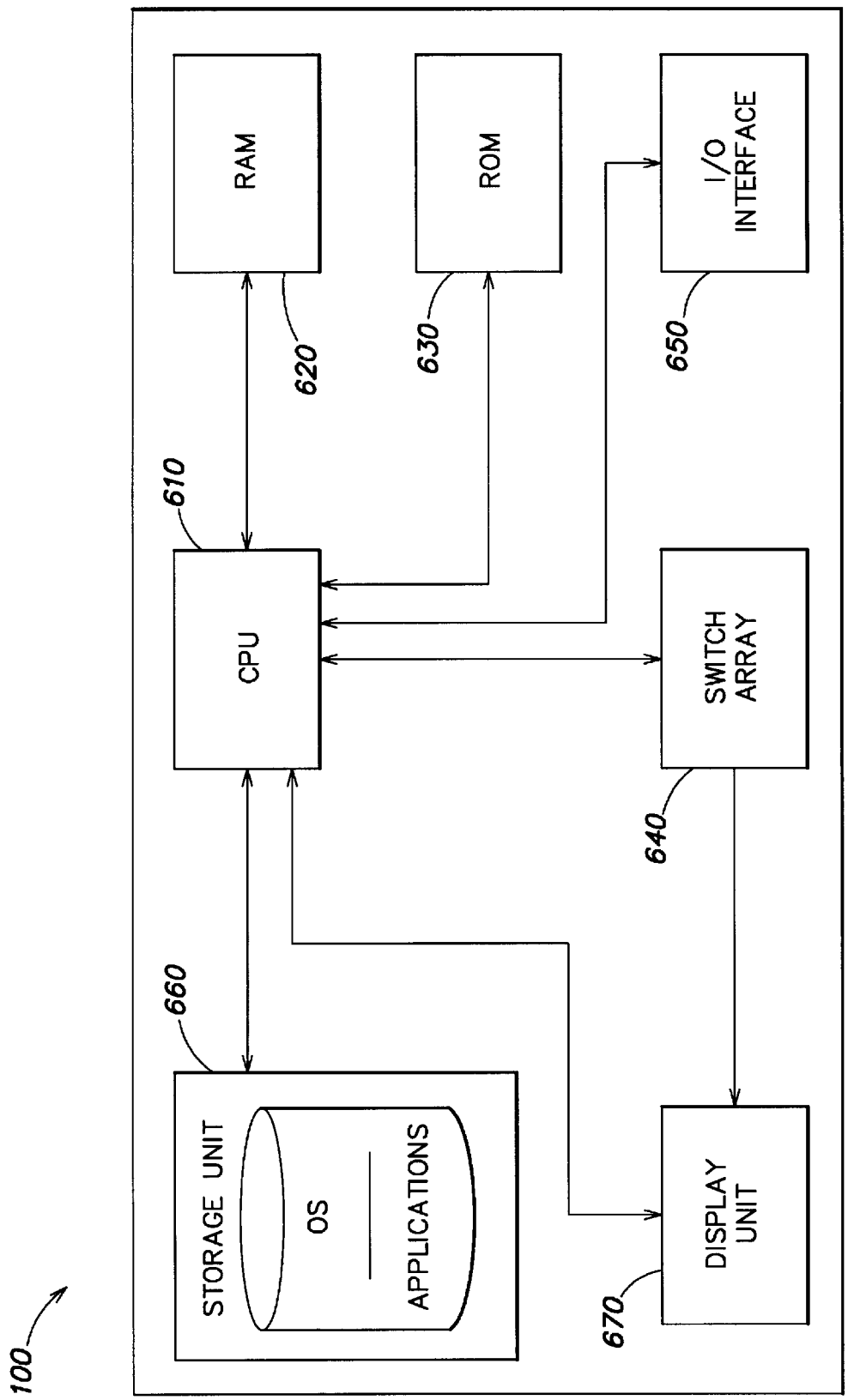
FIG. 6 is a functional block diagram of the adjustable display device of FIG. 1.

FIG. 6 is a functional block diagram of an exemplary embodiment of the adjustable display device 100 of FIG. 1. As illustrated, the adjustable display device 100 includes a controller 610 such as a central processing unit (CPU), a random access memory (RAM) 620, a read-only memory (ROM) 630, a switch array 640, an input/output (I/O) interface 650, a storage unit 660 and a display unit 670. The controller 610 is operatively coupled to the RAM 620, the ROM 630, the switch array 640, the I/O interface 650, the storage unit 660, and the display unit 670. Moreover, the switch array 640 is also operatively coupled to the display unit 670. Other hardware configurations also may be employed.

The controller 610 may include one or more commercially available microprocessors such as Pentium based processors available from Intel Corporation, PowerPC microprocessors available from Motorola, Inc., and Crusoe processors available from Transmeta Corp. More specifically, the controller 610 controls data transfer operations among the various components of the adjustable display device 100 such as accessing, retrieving and storing data in the storage unit 660, processing input command information received at the I/O interface 650, and retrieving data from the storage unit 660 for output display on the display unit 670.

The RAM 620 may store data for access and retrieval as well as for processing by the controller 610. The ROM 630 may store information related to the particular adjustable display device 100 (for access and retrieval by the controller 610), such as a unique serial number for the adjustable display device 100, display size and/or resolution for each folded/detached state, etc. The storage unit 660 may include a data storage unit such as a hard disk drive or an optical storage device provided with sufficient storage capacity to store the various applications installed in the adjustable display device 100 as well as the operating system (OS) software for the adjustable display device 100.

The applications stored in the storage unit 660 may be embodied as computer programs developed using an object oriented language that allows the modeling of complex systems with modular objects to create abstractions that are representative of real world, physical objects and their interrelationships. However, it would be understood by one of ordinary skill in the art that the various embodiments as described herein may be implemented in many different ways using a wide range of programming techniques as well as general purpose hardware systems or dedicated controllers.

The I/O interface 650 may include one or more communication terminals configured to connect to external devices such as input devices (for example, a keyboard, a computer mouse, or a touch-pad input device), output devices (such as display monitors, docking stations for the adjustable display device 100, printers, and scanners), and external storage devices (such as Zip drives and CD-RW drives). Referring back to FIGS. 3 and 6, the I/O interface 650 may include one or more of an infrared communication port, a USB port, a Bluetooth port, a IEEE 1394 (Firewire) communication port, each configured to establish a compatible data exchange protocol for communicating with external devices connected to the adjustable display device 100. The controller 610 may be configured to detect the connection of an external device to one or more of the communication ports 310, 320, 330 shown in FIG. 3, receive a connection signal from the I/O interface 650, and accordingly, access the storage unit 660 to retrieve and load corresponding driver applications to establish data communication with the external device.

Referring again to FIG. 6, the switch array 640 detects the folded (or detached) state of display segments of the adjustable display device 100, and accordingly transmits detected signals to the controller 610 for processing. More specifically, the switch array 640 monitors the state of sensors 117*a*–*h* corresponding to the vertical and horizontal portions 109–112 illustrated in FIG. 1 to determine the current folded (detached) state of the adjustable display device 100. Upon sensing a folding (detaching) operation, i.e., a change in the state of the adjustable display device 100, the switch array 640 transmits via controller 610, a hardware interrupt signal to the operating system (OS) of the adjustable display device 100. The sensors 117*a*–*h* of the switch array 640 may include any conventional switch, pressure sensor, contact device or the like.

Upon receiving the hardware interrupt signal, the operating system of the adjustable display device 100 transmits data signals to the applications that are running in the adjustable display device 100. These transmitted data signals may include data signals related to the size of the modified display area D (for example, identification information of the particular display segments of the adjustable display device 100 that make up the modified display area D after the folding (detaching) operation). In response to the data signals received from the operating system, the applications running in the adjustable display device 100 may redisplay (e.g., via the controller 610) any output data in the modified display area of the adjustable display device 100. The size, resolution, amount or some other characteristic of the output/display data may be adjusted prior to being redisplayed.

Figure 7:
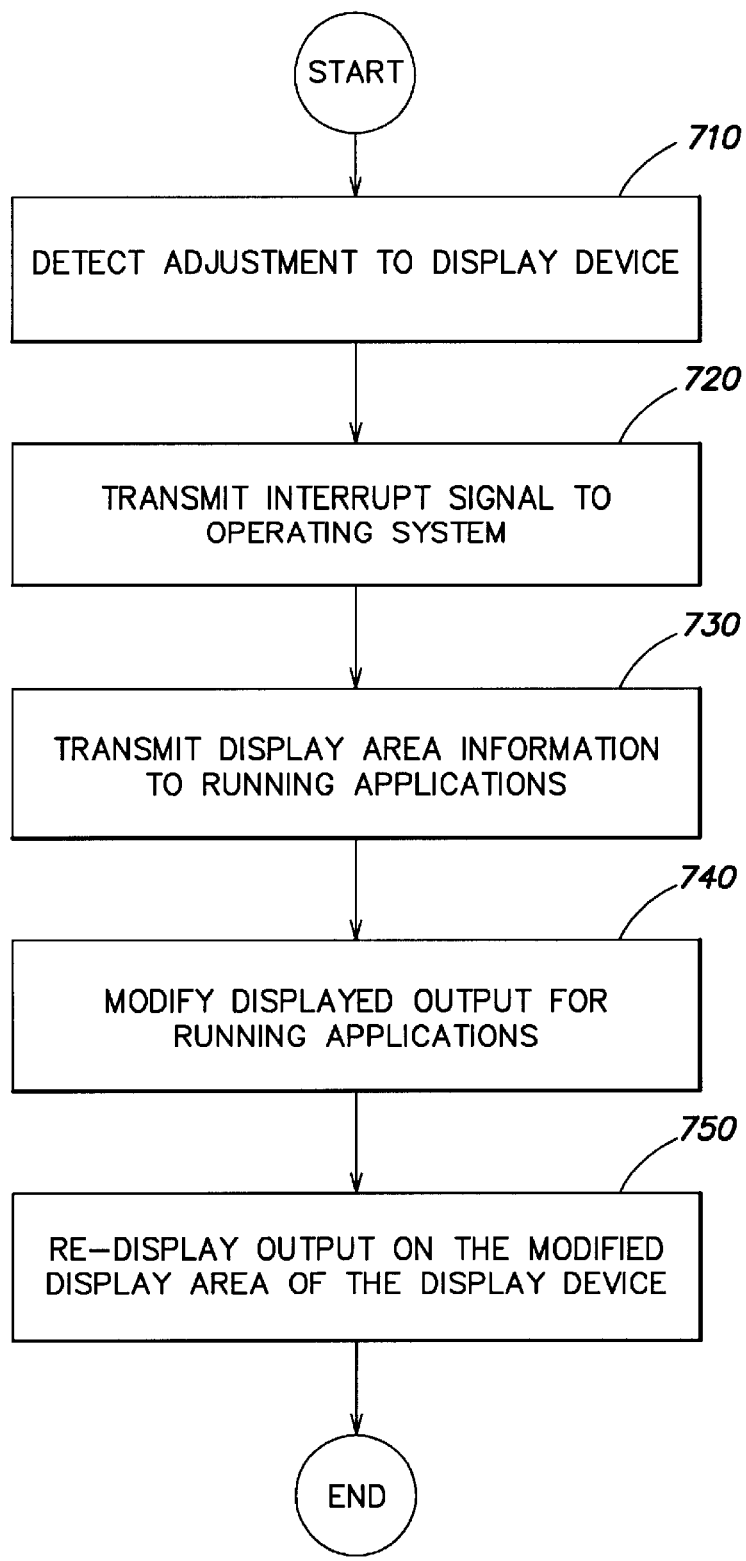
FIG. 7 is a flowchart illustrating the display operation of the adjustable display device of FIG. 1.

FIG. 7 is a flowchart illustrating the display operation of the adjustable display device 100 of FIG. 1.

With reference to FIG. 7, at step 710, an adjustment, such as a folding or detaching operation, to the size of the adjustable display device 100 (FIG. 1) is detected. In particular, switch array 640 as illustrated in FIG. 6, representing the state of a collection of sensors connected to each of the vertical and horizontal portions 109–112, detects when the state of the adjustable display device 100 changes, such as by removing one of the display segments 101–108 or by folding back one or more of the display segments 101–108. At step 720, hardware interrupt signals corresponding to the detected folding or detaching operation are transmitted by the controller 610 to the operating system of the adjustable display device 100. As discussed above, the interrupt signals may include information corresponding to the active (remaining) display segments as a result of the folding or detaching operation and may be generated by the switch array 640 for transmission to the controller 610. Other or alternative information may include information regarding the display segments removed or any other relevant information. The controller 610 then processes the received hardware interrupt signals for the operating system of the adjustable display device 100.

At step 730, in response to the received interrupt signals, the operating system of the adjustable display device 100 generates and transmits display area information to the applications running on the adjustable display device 100. More specifically, the operating system identifies the applications that are running when the folding/detaching operation occurred, and transmits information related to the modified display area size to each of the running applications. At step 740, each of the running applications employs the modified display area size information received from the operating system such that the output display for each running application is not degraded, distorted, lost, and/or a portion thereof cut off, as a result of the reduction in the display area size. For example, based on the modified display size information, the running applications may modify the output display such that the output display is adjusted in terms of display resolution, size, and/or position. At step 750, the adjusted output display for the running applications is re-displayed in the modified display area of the adjustable display device 100, and the process of FIG. 7 terminates.

In this manner, the adjustable display device 100 may be configured to dynamically adjust the output display of the adjustable display device 100 based on folding/detaching operations such that the displayed output images, text, and video graphics are recalibrated and adjusted for the modified display area size of the adjustable display device 100. FIGS. 4A–4C and FIGS. 5A–5D illustrate examples of the dynamic modification of the output display of the adjustable display device 100 during the various stages of the folding/detaching operation. A similar process may be employed to affect the output display of the adjustable display device 100 when the display segments 101–108 are unfolded/reattached.

Figure 8:
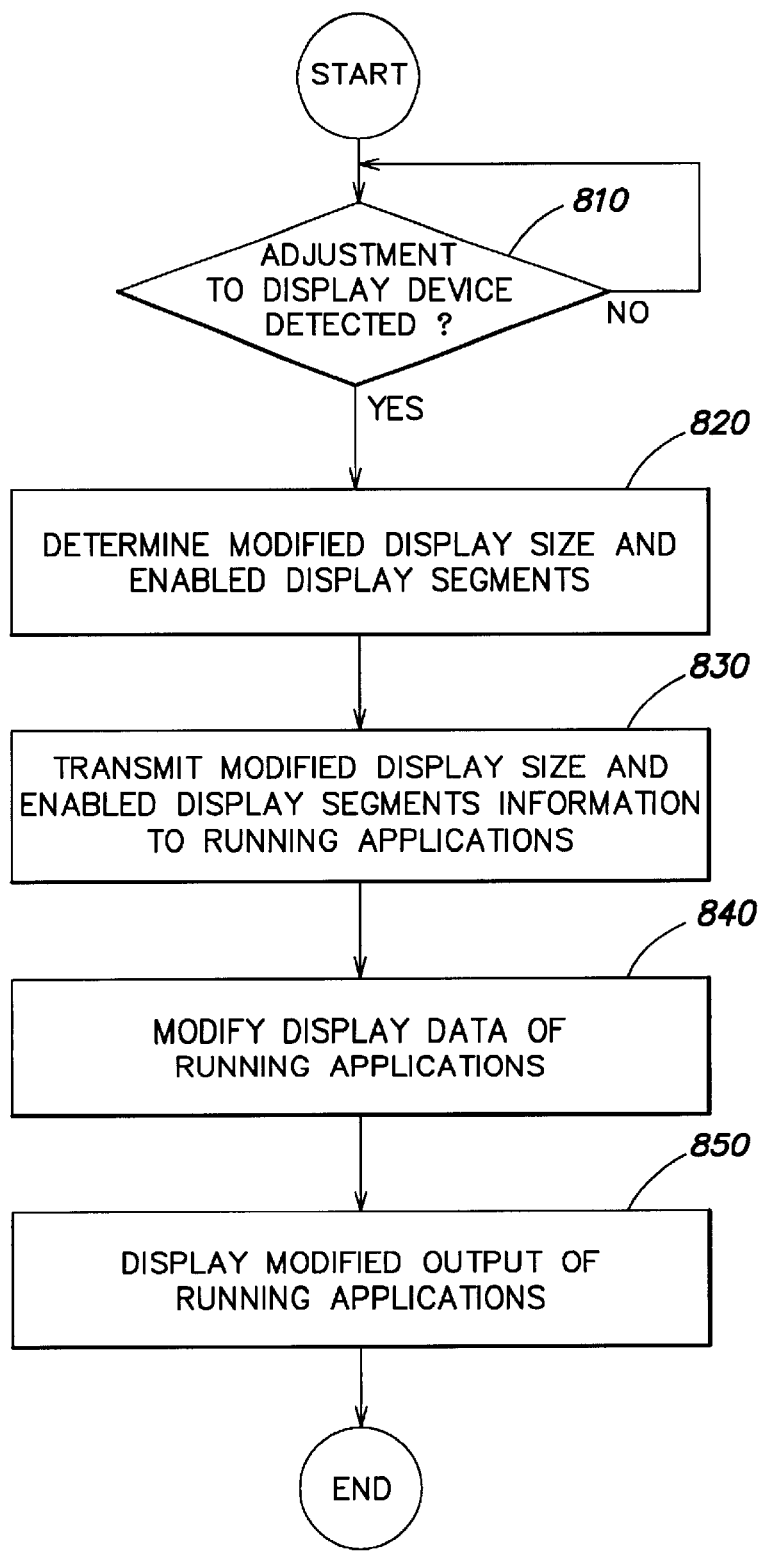
FIG. 8 is a flowchart illustrating an alternative display operation of the adjustable display device of FIG. 1.

FIG. 8 is a flowchart illustrating another embodiment of the display operation of the adjustable display device 100 of FIG. 1. Referring to the FIG. 8, at step 810, the adjustable display device 100 determines whether a change in the size of the adjustable display device 100 has been detected, such as from the removal of one of the display segments 101–108 or by a folding back of one or more of the display segments 101–108. This detection step is similar to the detection step 710 illustrated in FIG. 7. When an adjustment to the size of the adjustable display device 100 has been detected, at step 820 the modified display area size of the adjustable display device 100, as a result of the adjustment is determined (e.g., the enabled display segments of the display area are identified). Thereafter at step 830, the modified display area size information and the enabled display segments information are transmitted to applications that were running on the adjustable display device 100 when the folding/detaching operation was detected. At step 840, the displayed data for each running application is adjusted for size and/or resolution based on the modified display area information and the enabled display segments information. Lastly, at step 850 the adjusted display data for each running application is output for display on the modified display area of the adjustable display device 100.

In this manner, the same displayed information for each running application, whether it be text data, video graphical data, image data, or a combination of various different types of data, may be displayed after the adjustment operation reduces or increases the size of the display area of the adjustable display device 100, preferably such that the displayed data of the running applications remains viewable. It will be appreciated that for those display operations where the adjustable display device 100 is unfolded or display segments are re-attached to the adjustable display device 100, thereby increasing the display area size, the display operations described in conjunction with FIGS. 7–8 equally apply.

Indeed, in accordance with the various embodiments of the present invention, the adjustable display device 100 may be configured to dynamically adjust the size of the displayed data (including text and/or image and video graphical information) based on the modified display area of the display device 100 such that the displayed data is adjusted for the respective folded/detached state of the adjustable display device 100, without sacrificing any portion of the displayed data. Further, as discussed above, the displayed image 113 as well as the corresponding touch sensitive input panel portion 114 at each collapsed state of the adjustable display device 100 may be modified with each change in size of the display area such that the displayed image 113 and the touch sensitive input panel portion 114 are correspondingly repositioned and resized relative to the modified display area of the adjustable display device 100.

Accordingly, the foregoing description discloses only exemplary embodiments of the invention. Modifications of the above disclosed apparatus and method which fall within the scope of the invention will be readily apparent to those of ordinary skill in the art. It should be understood that other embodiments may fall within the spirit and scope of the invention, as defined by the following claims.

What is claimed is:

1. An adjustable display device, comprising:
    a plurality of display segments defining an adjustable size of a display device for displaying data;
    a detection mechanism operatively coupled to the plurality of display segments, the detection mechanism configured to detect a change in size of the display device by displacement of at least one of the plurality of display segments and to generate a corresponding detection signal; and
    a controller operatively coupled to the detection mechanism and configured to:
        receive the detection signal;
        adjust displayed data of the display device in response to the detection signal such that the adjusted displayed data fits on one or more of the display segments and includes a representation of substantially all the displayed data; and display the adjusted displayed data on the one or more of the display segments.

2. The device of claim 1 wherein the controller is configured to adjust the displayed data by changing at least one of size and resolution of the displayed data responsive to the detection signal.

3. The device of claim 1 wherein the detection signal includes information corresponding to the change in the size of the display device.

4. The device of claim 1 wherein each of said display segments has a substantially same dimension.

5. The device of claim 1 wherein the displacement of at least one of the plurality of display segments includes one of unfolding and folding the display device such that the size of the display device is changed by at least one display segment.

6. The device of claim 1 wherein the displacement of at least one of the plurality of display segments includes one of detaching and attaching at least one display segment of the display device.

7. The device of claim 1 wherein the displayed data includes one or more of text data, image data, and video graphic data.

8. The device of claim 2 wherein content of displayed data that is changed in size is similar to content of data displayed before the size of the display device is changed.

9. The device of claim 1 wherein the detection mechanism comprises a switch array.

10. The device of claim 9
wherein the switch array comprises a plurality of sensors, each sensor operatively coupled to a respective one of the plurality of display segments and configured to generate a detection signal when the corresponding display segment is displaced.

11. The device of claim 1 further including a storage unit operatively coupled to the controller and configured to store one or more application programs.

12. The device of claim 1 further including an interface operatively coupled to the controller, the interface configured to communicate with one or more external devices.

13. The device of claim 12 wherein the interface further includes one or more of a USB port, an IEEE 1394 communication port, an IrDA port, and a Bluetooth port.

14. The device of claim 2 wherein displayed data changed in size is changed by an amount that is substantially proportional to the change in the size of the display device.

15. The device of claim 2 wherein resolution of displayed data is dynamically adjusted corresponding to the change in the size of the display device.

16. An adjustable display device, comprising:
a plurality of display segments defining an adjustable size of a display device for displaying data;
a plurality of sensors operatively coupled to the plurality of display segments, each sensor configured to detect a change in size of the display device by displacement of at least one of the plurality of display segments and to generate a corresponding detection signal; and
a controller operatively coupled to the plurality of sensors and configured to:
receive a detection signal from each sensor;
adjust displayed data of the display device in response to any received detection signal; and
display the adjusted displayed data on one or more of the display segments;

wherein the displacement of at least one of the plurality of display segments includes one of unfolding, folding, attaching and detaching one or more display segments of the display device such that the size of the display device is changed by at least one display segment.

17. The device of claim 16 wherein each sensor is operatively coupled to a respective one of the plurality of display segments, each sensor configured to generate a detection signal when the corresponding display segment is displaced.

18. The device of claim 16 wherein the controller is configured to adjust displayed data by changing at least one of size, resolution and amount of displayed data responsive to any received detection signal.

19. The device of claim 18 wherein displayed data changed in size is changed by an amount that is substantially proportional to the change in the size of the display device.

20. The device of claim 18 wherein resolution of displayed data is dynamically adjusted corresponding to the change in the size of the display device.

21. A method for adjusting displayed data in response to an adjustment in a size of a display device, comprising the steps of:
detecting a displacement of one of a plurality of display segments defining an adjustable size of the display device;
determining a modified size of the display device based on the detected displacement;
adjusting the displayed data based on the determined modified size of the display device such that the adjusted displayed data fits on the modified size of the display device and includes a representation of substantially all the displayed data; and
displaying the adjusted displayed data.

22. The method of claim 21 wherein the adjusting step includes the step of adjusting a resolution of the displayed data.

23. The method of claim 21 wherein the adjusting step includes the step of adjusting a size of the displayed data.

24. The method of claim 21 wherein content of the displayed data after the displayed data is adjusted is similar to content of the displayed data before the displayed data is adjusted.

25. The method of claim 21 further including the step of monitoring the display device for the displacement of one of the plurality of display segments.

26. The method of claim 21 wherein the determining step comprises the step of transmitting detected displacement information to one or more applications running on the display device.

27. The method of claim 21 wherein the displacement detecting step further comprises the step of transmitting an interrupt signal to an operating system of the display device.

28. The method of claim 21 wherein the displacement detecting step comprises detecting one of an unfolding and a folding of the display device such that the size of the display device is changed by at least one display segment.

29. The method of claim 21 wherein the displacement detecting step comprises detecting one of a detaching and an attaching of at least one display segment of the display device.

30. The method of claim 21 wherein the adjusting step comprises adjusting a size of the displayed data to be substantially proportional to the modified size of the display device.

31. The method of claim 21 wherein the adjusting step further comprises dynamically adjusting a resolution of the adjusted displayed data corresponding to the modified size of the display device.

32. An adjustable display device, comprising:
a plurality of display means for defining an adjustable size of a display device for displaying data;
detection means operatively coupled to the plurality of display means, the detection means for detecting a change in size of the display device by displacement of at least one of the plurality of display means and for generating a corresponding detection signal; and
control means operatively coupled to the detection means for receiving the detection signal and for changing at least one of size and resolution of displayed data of the display device in response to the detection signal such that substantially all data displayed before a change in size of the display device fits on the display device after the change in size of the display device.

33. A computer program product comprising:
a medium readable by a computer, the computer readable medium having computer program code adapted to:
detect a displacement of one of a plurality of display segments defining an adjustable size of a display device;
determine a modified size of the display device based on the detected displacement;
adjust displayed data based on the determined modified size of the display device such that the adjusted displayed data fits on the modified size of the display device and includes substantially all of the displayed data; and
display the adjusted displayed data.

34. A method comprising:
detecting a displacement of at least one display segment of a plurality of display segments wherein the plurality of display segments together define a display; and
adjusting a representation of information to be displayed on the display such that the adjusted representation fills all active display segments and conveys substantially all the information that the representation would have conveyed when displayed on the display before the displacement of the at least one display segment.

35. An apparatus comprising:
a display defined by a plurality of display segments;
a sensor coupled to the display and operable to detect a modification of the display in the form of a displacement of at least one of the display segments; and
a controller coupled to the display and operable to adjust a representation of information to be displayed on the modified display such that the adjusted representation fills all active display segments and conveys substantially all the information the representation conveys when displayed on an unmodified display.

36. An adjustable display device, comprising:
a plurality of display segments defining an adjustable size of a display device for displaying data;
a detection mechanism operatively coupled to the plurality of display segments, the detection mechanism configured to detect a change in size of the display device by displacement of at least one of the plurality of display segments and to generate a corresponding detection signal; and
a controller operatively coupled to the detection mechanism and configured to:
receive the detection signal;
adjust displayed data of the display device in response to the detection signal such that the displayed data fits on one or more of the display segments; and
display the adjusted displayed data on one or more of the display segments,
wherein the detection mechanism comprises a switch array, and
wherein the switch array comprises a plurality of sensors, each sensor operatively coupled to a respective one of the plurality of display segments and configured to generate a detection signal when the corresponding display segment is displaced.

\* \* \* \* \*